W. J. COOPER.
BLOWPIPE BURNER.
APPLICATION FILED NOV. 5, 1919.
1,387,591. Patented Aug. 16, 1921.
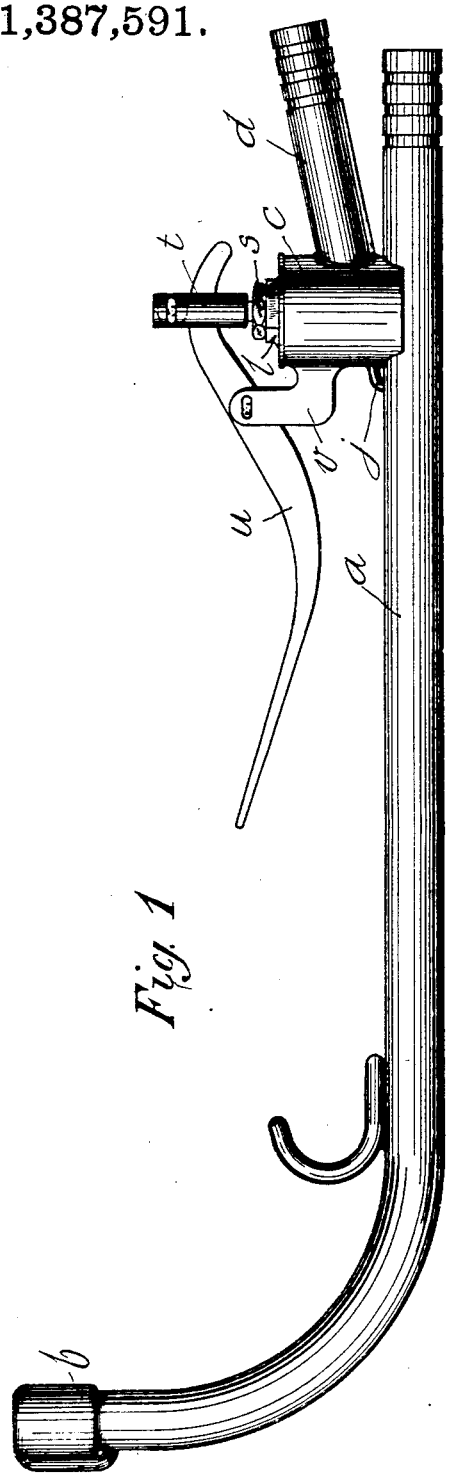
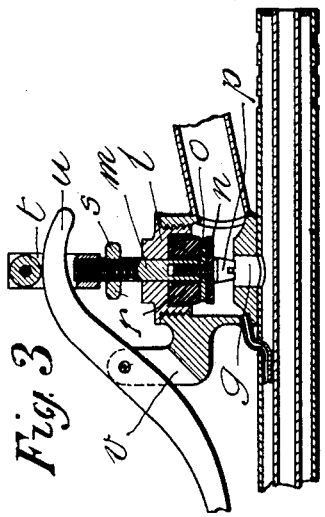
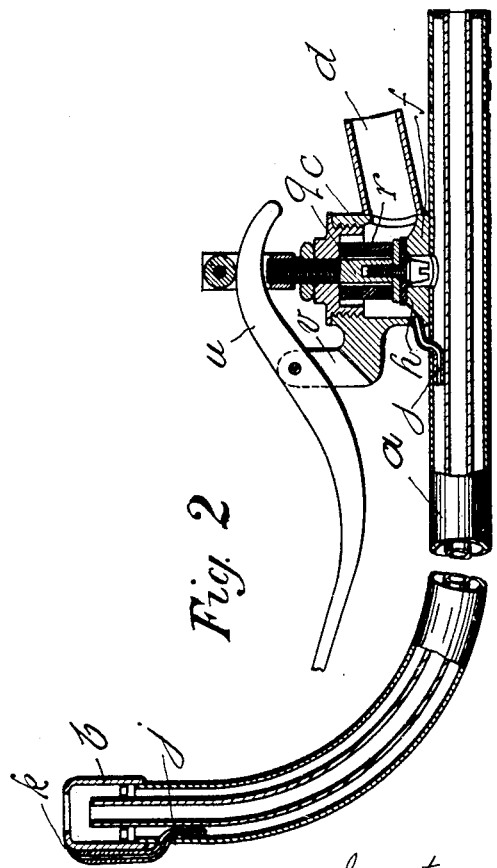

UNITED STATES PATENT OFFICE.

WILLIAM JAMES COOPER, OF SMETHWICK, ENGLAND.

BLOWPIPE-BURNER.

1,387,591.　　Specification of Letters Patent.　Patented Aug. 16, 1921.

Application filed November 5, 1919. Serial No. 335,828.

*To all whom it may concern:*

Be it known that I, WILLIAM JAMES COOPER, subject of the King of Great Britain, residing at 356 St. Paul's road, Smethwick, Staffordshire, England, have invented certain new and useful Improvements in Blowpipe-Burners, of which the following is a specification.

The invention refers to improvements in blow pipe burners and more particularly to gas and compressed air blow pipes such as are used for brazing and like purposes.

An object of the present invention is to simplify and improve the valve and valve box of the burner so that this is more readily constructed and is easier and more efficient in operation.

A further object is to prevent leakage of gas around the valve stem in the valve box.

In the accompanying drawings:—

Figure 1 is an elevation of a blow pipe burner constructed and arranged in accordance with my invention.

Fig. 2 is a sectional view of the same showing the valve closed.

Fig. 3 is a detail sectional view of the same showing the valve open.

In accordance with my improvements I mount upon a suitable pipe $a$ carrying at one end the burner $b$, a box or casing $c$ preferably cylindrical, on to which a gas supply pipe $d$ is suitably secured above the first named pipe.

The bottom $f$ of said box or casing is fitted with a valve opening $g$ in communication with the pipe $a$ and said valve opening preferably has a projecting seating $h$. In the box or casing $c$ preferably level with the bottom $f$ the gas supply has its opening, and a small pipe $j$ leads from the opposite side of the said box or casing through the pipe $a$ to form a pilot jet or by pass $k$.

The upper part of the box or casing $c$ is screwed internally to receive therein a gland $l$ carrying a valve $m$ for closing the valve opening $g$.

The said valve may have any particular shape and preferably consists of a rubber or other suitable washer $n$ mounted on a metal or like plate $o$ and secured by a screw $p$ or like means to the end of a rod or plunger $q$. This rod or plunger $q$ passes through a hole disposed in the center of the gland $l$. A spring member is interposed between the gland $l$ and the metal disk $o$ to keep the valve closed against the seating. This spring member consists of a sleeve or tube $r$ preferably of rubber or suitable rubber compound disposed around the rod or plunger $q$, as has been proposed for faucets, which rubber tubing in assuming the functions of a spring acts as a stuffing box and prevents gas leaking out of said box or casing around the rod or plunger, and through the opening in the gland. This sleeve spring also insures an even distribution of pressure upon the valve than an ordinary open metal helical spring which quite commonly bears at one point only.

The external extremity of the plunger $q$ is fitted with a regulating nut $s$ or like means and a jaw end $t$ in which is engaged the end of a hand lever $u$ fulcrumed on a bracket $v$ on the outside of the box or casing.

This improved construction of the valve chamber or casing has the advantage of being practically jointless and prevents gas or the like from leaking as has hitherto been the case, beside being easy and cheap to manufacture.

I claim:—

1. A blow pipe burner comprising in combination a valve chamber secured directly on the blow pipe, a gas supply pipe leading into said chamber, a closure plate for the top of the chamber and a valve seating at the bottom communicating directly with the blow pipe, a valve in the chamber having a stem projecting through the said closure plate for engagement by a hand lever, and a rubber sleeve spring around the stem and in compression between the valve and the closure plate to seat the valve and to act as a stuffing box to prevent leakage of the gas.

2. A blow pipe burner comprising in combination a valve chamber secured directly on the blow pipe, a gas supply pipe leading into said chamber, a closure plate for the top of the chamber and a valve seating at the bottom communicating with the blow pipe, a flat disk valve in said chamber seated by a rubber sleeve spring to control the main gas supply, and a small pipe leading from the opposite side of said chamber into the blow pipe to form a pilot jet.

In testimony whereof I affix my signature.

WILLIAM JAMES COOPER.